3,074,957
CERTAIN 3-ALKENYL-1,2,4-OXADIAZOLES
Fred C. Schaefer, Darien, and Mary E. Castellion, Stamford, Conn., assignors to American Cyanamid Company, New York, N.Y., a corporation of Maine
No Drawing. Filed Oct. 7, 1960, Ser. No. 61,085
5 Claims. (Cl. 260—307)

The present invention relates to novel polymerizable vinyl monomers and methods for their preparation. More particularly, it relates to polymerizable 1,2,4-oxadiazoles which contain a vinyl grouping. Still more particularly, the invention is concerned with certain homopolymerized 1,2,4-oxadiazoles prepared from the aforementioned vinyl monomers.

The compounds of the present invention which can be readily polymerized, are characterized by the general formula:

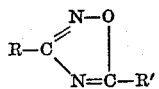

wherein R is either the vinyl (CH$_2$=CH—) or the isopropenyl

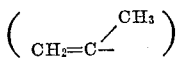

radical and R' stands for hydrogen or lower alkyl of from 1 to 4 carbon atoms. Advantageously, the novel polymers can be homopolymerized to form polymers useful in coating various substrata such as, for instance, textiles. Further, oxadiazoles of the present invention possess basic properties, which are highly desirable in effecting ready dyeing of such coated substrata with acid dye-stuffs.

In general, it has been found that the compounds of the present invention may be prepared by reacting either a 2-hydroxyalkaneamidoxime or a 3-hydroxyalkaneamidoxime with a cyclizing agent to form a 3-hydroxyalkyl-1,2,4-oxadiazole which is acylated in the same or subsequent step to form the corresponding 3-acyloxyalkyl-1,2,4-oxadiazole. The latter is next sufficiently heated to form either a 3-vinyl or 3-isopropenyl-1,2,4-oxadiazole.

Illustrative of the 2- or 3-hydroxyalkaneamidoxime intermediates useful in the practice of the invention are: lactamidoxime, α-hydroxyisobutyramidoxime and β-hydroxypropionamidoxime, as well as their acid salts. The latter are conveniently prepared by reacting approximately equimolar quantities of hydroxylamine and an appropriate cyanohydrin.

Representative cyclizing agents effective in ring-closing the aforementioned hydroxyalkaneamidoximes are: (a) aliphatic monocarboxylic acid anhydrides and halides such as acetic anhydride, acetyl chloride and propionic acid anhydride, thereby forming a 5-alkyl-1,2,4-oxadiazole, and (b) nitrogen compounds such as formamidine or s-triazine to form a 5-unsubstituted-1,2,4-oxadiazole. Following cyclization in (b), however, acylation is carried out in a separate step to obtain a 3-acyloxyalkyl-1,2,4-oxadiazole. However, it is preferred to employ a monocarboxylic acid anhydride as the cyclization reagent for the reason that swift ring-closure and acylation on the 3-position of the oxadiazole is readily accomplished in a single operation.

The preferred overall-reaction discussed above, in which lactamidoxime and acetic anhydride will be taken as illustrative of the process of the invention, may, for convenience, be written stepwise as follows:

I.
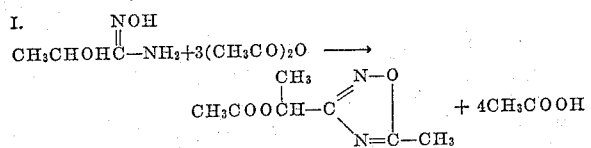
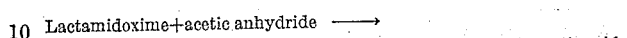
Lactamidoxime+acetic anhydride ⟶
3-acetoxyethyl-5-methyl-1,2,4-oxadiazole + acetic acid II.
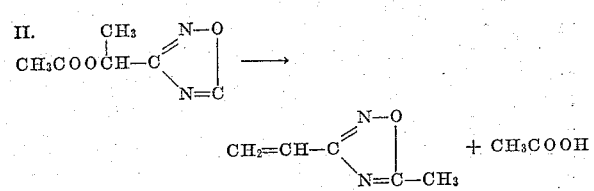
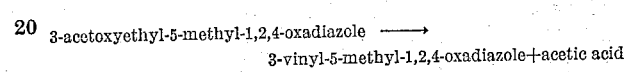
3-acetoxyethyl-5-methyl-1,2,4-oxadiazole ⟶
3-vinyl-5-methyl-1,2,4-oxadiazole+acetic acid The hydroxyalkaneamidoxime can be swiftly ring-closed employing the aforementioned cyclizing compounds, particularly when utilizing at least equivalent amounts of the axidoxime and the cyclizing compounds. Usually, a slight mol excess of cyclizing reagent per mol of hydroxyalkaneamidoxime is desirable for reaction. Temperature of cyclization and for acylation may be widely varied, usually between about 80° C. and about 150° C., and preferably reflux temperatures are employed. Resultant 3-(acyloxyalkyl)-1,2,4-oxadiazole is then pyrolyzed by passing the same through a reactor held at a temperature between about 300° C. and about 500° C. to recover a 3-vinyl or 3-isopropenyl-1,2,4-oxadiazole obtained in good yield and purity.

The invention will be further illustrated by the following examples none of which is to be taken or is intended to be limitative of the invention. The parts given are by weight, unless otherwise noted.

EXAMPLE 1

A mixture of 4.6 parts of lactamidoxime and 18 parts of acetic anhydride is heated for two hours at 95° C. Resultant reaction product is treated with water to decompose any unreacted anhydride. Crude 1,2,4-oxadiazole is recovered by evaporation of both water and acetic acid at 10 mm. Hg pressure. The residue is further dried by diluting it with butanol and reevaporating the same. The crude dry product is distilled at about 1 mm. Hg pressure and is recovered in 56 percent yield as 3-(1-acetoxyethyl)-5-methyl-1,2,4-oxadiazole having a boiling point equal to 71° C. to 73° C. at 3 mm. Hg pressure.

The latter oxadiazole is next added dropwise to the top of a one inch internal diameter [I.D.] Pyrex glass reactor tube, packed with 6 mm. Pyrex glass beads, which tube is heated over a twelve inch zone in an electric furnace maintained at a temperature of from 440° C. to 460° C. The rate of flow is held at 0.5 gram of the oxadiazole per minute, while maintaining a slow stream of nitrogen through the apparatus during pyrolysis. Pyrolyzate is next collected in a chilled receiver.

Pyrolyzed product from each pass is distilled through a simple distilling head to collect a vinyl oxadiazole-acetic fraction boiling at about 100° C. under 19 mm. Hg pressure. This mixture is neutralized with aqueous sodium carbonate solution and the vinyl compound is extracted with ether, dried and distilled. It boils at 73° C. under a reduced pressure of 63 mm. Hg, has a refractive index ($N^{25}_D$) equal to 1.4592 and is recovered as 3-vinyl-5-methyl-1,2,4-oxadiazole in 86 percent yield.

EXAMPLE 2

To 102 parts of 2-hydroxyisobutyramidoxime (prepared by reacting acetone cyanohydrin and hydroxylamine and having a melting point equal to 113° C. to 114° C.) are slowly added 380 parts of acetic anhydride. The mixture is warmed slowly and maintained at about 120° C. for about three and one-half hours. The mixture is cooled and poured into 100 parts of ice-water. Acetic acid and residual anhydride are neutralized with sodium hydroxide and the resultant product, 3-(1-acetoxyisopropyl)-5-methyl-1,2,4-oxadiazole, is extracted with ether. The latter solution is dried and then distilled. The product, boiling at 63° C.–64° C. at 1.5 mm. Hg pressure, is recovered in 70 percent yield.

As in Example 1 above, pyrolysis is carried out in a vertical one inch internal diameter Pyrex glass reactor tube packed with 6 mm. Pyrex glass beads and heated over a twelve inch zone in an electric furnace held at a temperature of about 360° C. The latter temperature is measured by a thermocouple located at about the midpoint of the heated zone. The 3-(1-acetoxyisopropyl)-5-methyl-1,2,4-oxadiazole is added dropwise to the top of the column at a rate equal to from about 0.6 to 0.7 gram per minute, while passing therethrough a stream of nitrogen. Pyrolyzate is collected below in a chilled receiver.

Pyrolyzate is distilled at 90° C. and 20 mm. Hg pressure to obtain a mixture of acetic acid and 3-isopropenyl-5-methyl-1,2,4-oxadiazole. The mixture is neutralized with potassium hydroxide and the oxadiazole is extracted with ether solution, dried and resultant product distilled at 85° C. under 57 mm. Hg pressure. A 67 percent yield, based on converted ester and having a refractive index ($N^{25}_D$) equal to 1.4620 is obtained.

EXAMPLE 3

To a suitable reaction vessel containing 132 parts of acetic anhydride are added over a ten minute period 44.5 parts of 3-hydroxypropionamidoxime having a melting point equal to 92° C. to 94° C. The latter amidoxime is prepared by reacting hydroxylamine and ethylenecyanohydrin. Resultant mixture is held for 30 minutes at 60° C. and then refluxed for three hours. Acetic acid is next distilled off at atmospheric pressure. Residue is concentrated at a reduced pressure of 20 mm. Hg pressure and the high boiling product fractionally distilled. Yield of crude 3-(2-acetoxyethyl)-5-methyl-1,2,4-oxadiazole is about 56 percent. On redistilaltion of the crude oxadiazole, the product yields a center cut boiling at 85° C. to 87° C. at 2 mm. Hg pressure and having a refractive index ($N^{25}_D$) equal to 1.4480.

Pyrolysis is carried out by following the procedure of Example 1 above in every detail except that 3-(2-acetoxyethyl)-5-methyl-1,2,4-oxadiazole is substituted for 3-(1-acetoxyethyl)-5-methyl-1,2,4-oxadiazole to obtain the corresponding desired 3-vinyl-5-methyl-1,2,4-oxadiazole compound.

EXAMPLE 4

Equimolar amounts of 3-hydroxypropionamidoxime hydrochloride and s-triazine are added to a suitable reaction vessel and heated for forty-eight hours in methyl alcohol at 25° C. Formamidine hydrochloride equivalent to the amidoxime hydrochloride used is precipitated as a by-product by adding ether thereto. Resultant solution is evaporated at about 10 mm. Hg pressure to obtain crude 3-(2-hydroxyethyl)-1,2,4-oxadiazole. One part of the residue is acetylated with one part of acetic anhydride by heating the mixture at 120° C. to obtain 3-(2-acetoxyethyl)-1,2,4-oxadiazole which is recovered in pure form. The oxadiazole is next pyrolyzed by following the procedure of Example 3 above in every detail to thereby obtain 3-vinyl-1,2,4-oxadiazole in good yield and purity. The vinyl compound boils at 60° C. at 60 mm. Hg pressure and is soluble in alcohol or benzene at room temperature.

EXAMPLE 5

Example 4 above is followed in every material detail except that 2-hydroxyisobutyramidoxime is substituted for 3-hydroxypropionamidoxime. A good yield of 3-isopropenyl-1,2,4-oxadiazole, having a boiling point equal to about 70° C. at 60 mm. Hg pressure is obtained. On infra red analysis, it is found that the product exhibits the characteristic absorption band of 3-isopropenyl-1,2,4-oxadiazoles at 1500 reciprocal centimeters.

The following examples serve to illustrate the homopolymerization of certain oxadiazoles produced by the process of the invention.

EXAMPLE 6

*Homopolymerization of 3-Vinyl-5-Methyl-1,2,4-Oxadiazole Monomer as Prepared in Example 1*

To a suitable reaction vessel are added ten parts of monomer and 0.25 parts of azobisisobutyronitrile in 55 parts of chlorobenzene. The vessel is then deaerated and sealed. After heating at 60° C. for twenty-two hours, a viscous clear solution is obtained. This solution is added to petroleum ether which causes the polymer to precipitate a snow-white flocculant solid. The polymer is next isolated by filtration after drying under vacuum at 60° C. 9.5 parts (95 percent) of a white powdery product is obtained. This polymer possesses the following properties:

Intrinsic viscosity—
  0.34 in dimethyl formamide at 30° C.;
  0.21 in benzene at 30° C.
Solubility—
  Soluble in alcohol and acetone;
  Insoluble in heptane, $CCl_4$, and water.
Thermal behavior—
  Softens at 98° C. and flows at 110° C.

A portion of this polymer is next cast on a glass plate to give a clear colorless film.

Another portion of the polymer dissolved in alcohol is used to coat a fabric by dipping the latter in the solution and drying the same.

Still another portion of the polymer is injected into a two-piece mold and subjected to 5000 p.s.i. for three hours. The pressure is then released and the desired molded article is easily removed from the mold.

EXAMPLE 7

*Homopolymerization of 3-Isopropenyl-5-Methyl-1,2,4-Oxadiazole Monomer as Prepared in Example 2*

A mixture of 0.0025 parts of bis-azoisobutyronitrile and 1.02 parts of 3-isopropenyl-5-methyl-1,2,4-oxadiazole in a heavy walled test tube is degassed four times by alternately cooling at −78° C. and evacuating and warming at room temperature. The tube is sealed and heated at 60° C. for sixty-four hours. Hard polymeric material is dissolved in benzene and precipitated by adding the solution to hexane. 0.79 parts of a white product, having an intrinsic viscosity in benzene at 30° C. equal to 0.73 are obtained. This polymer softens at 170° C. and melts at about 225° C. It is transformed into a clear, colorless film by slowly evaporating a dilute benzene solution of the polymer when cast on a glass plate. The polymer is found to be soluble in benzene and acetone and insoluble in water. It is stable in boiling water when immersed and remains unaffected therein even after more than about twenty-four hours. The polymer exhibits only a small decrease in intrinsic viscosity when refluxed for two days in nine percent aqueous hydrochloric acid.

We claim:
1. A compound of the formula:

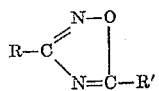

wherein R is a radical selected from the group consisting of vinyl and isopropenyl and R' is a radical selected from the group consisting of hydrogen and a lower alkyl of from 1 to 4 carbon atoms.

2. As a polymerizable monomer: 3-vinyl-5-methyl-1,2,4-oxadiazole.

3. As a polymerizable monomer: 3-isopropenyl-5-methyl-1,2,4-oxadiazole.

4. As a polymerizable monomer: 3-vinyl-5-ethyl-1,2,4-oxadiazole.

5. As a polymerizable monomer: 3-vinyl-1,2,4-oxadiazole.

References Cited in the file of this patent
UNITED STATES PATENTS

| | | |
|---|---|---|
| 2,855,402 | Cramer | Oct. 7, 1958 |
| 2,938,017 | Grosser | May 24, 1960 |
| 2,946,772 | Walles et al. | July 26, 1960 |